May 20, 1958  J. KAMLET  2,835,708
PROCESS FOR THE MANUFACTURE OF RESORCINOL
Filed Sept. 7, 1954
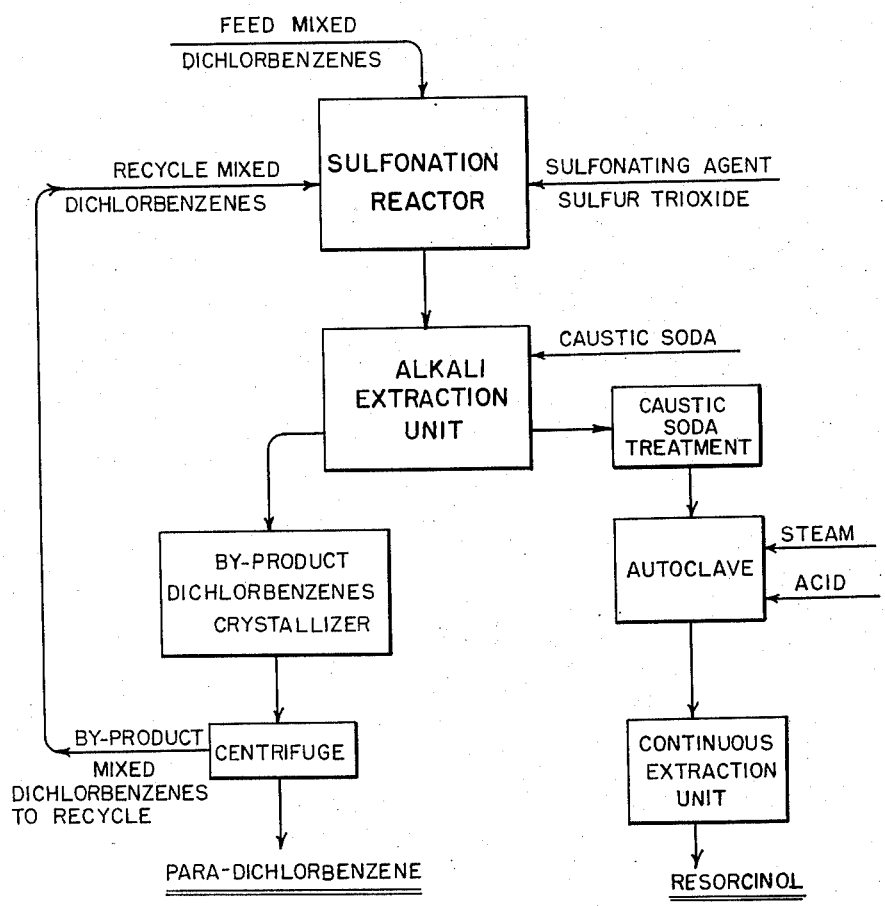
INVENTOR

United States Patent Office 2,835,708
Patented May 20, 1958

2,835,708

PROCESS FOR THE MANUFACTURE OF RESORCINOL

Jonas Kamlet, New York, N. Y., assignor to The Goodyear Tire & Rubber Company, a corporation of Ohio Application September 7, 1954, Serial No. 454,600

8 Claims. (Cl. 260—628)

This invention relates to a process for the manufacture of resorcinol. More particularly, it relates to a process whereby resorcinol may be manufactured in good yield from cheap and readily available raw materials without the employment of a step involving fusion with alkali. It has for its purpose to provide a process for the manufacture of resorcinol which obviates the various technical difficulties now attendant on the industrial preparation of this important chemical.

Resorcinol has heretofore been manufactured almost exclusively by the alkali fusion of sodium meta-benzenedisulfonate. In common with all alkali fusions at advanced temperatures, this process involves the use of special equipment, considerable corrosion problems and relatively high labor costs. The preparation of the intermediate sodium m-benzenedisulfonate involves further equipment and installations.

The basis of this invention is the finding that resorcinol may be obtained in good yield by the reaction of a water-soluble salt of 2,4-dichlorobenzenesulfonic acid with an alkali metal hydroxide at temperatures between 100° C. and 300° C., acidification of the reaction mixture and the hydrolysis of the resultant solution of 2,4-dihydroxybenzenesulfonic acid at a temperature between 100° C. and 300° C. This may be represented by the following equations:

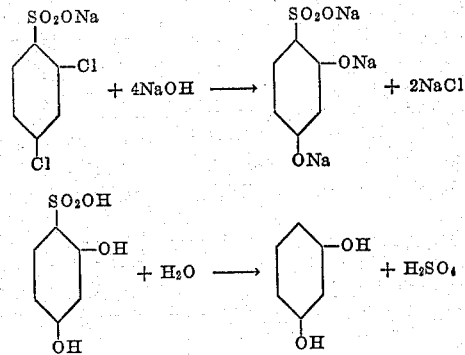

The drawing is a flow sheet illustrating the process of the invention.

The starting material for this process is 2,4-dichlorobenzenesulfonic acid, which may be obtained by the sulfonation of meta-dichlorobenzene (Beilstein and Kurbatow, Annalen 182, 97 (1876); Holleman and Von der Linden, Recueils trav. chim. Pays-Bas 30, 334 (1911); Van de Lande, Recueils trav. chim. Pays-Bas 51, 98–113 (1932)). To obtain a pure resorcinol, a relatively pure 2,4-dichlorobenzenesulfonic acid is required. However, meta-dichlorobenzene free of isomers is not an article of commerce and is not readily available. An essential feature of my new invention is therefore the development of a simple method for the derivation of a relatively pure 2,4-dichlorobenzenesulfonic acid from readily available intermediates.

It has long been known that ortho-, para- and mixtures of ortho- and para-dichlorobenzenes can be thermally isomerized to equilibrium mixtures containing appreciable amounts of meta-dichlorobenzene and that it may also be obtained in admixture with the other two isomers by the chlorination of benzene or chlorobenzene at advanced temperatures (Wibant, Van de Lande and Wallagh, Recueils trav. chim. Pays-Bas 56, 65–70 (1937). Thus, in U. S. Patent 2,123,857 (1938), these workers describe a process whereby chlorobenzene is chlorinated at 500° C. to 600° C. to yield a mixture of 15–21% ortho-dichlorobenzene, 54–60% meta-dichlorobenzene and 24% of para-dichlorobenzene. Wheeler and Imperial Chemical Industries describe a similar process in British Patent 388,818 (1933).

Ortho-dichlorobenzene boils at 180°–183° C. at 760 mm. Hg and may readily be separated from the other two isomers by fractional distillation, preferably under reduced pressures. However, meta-dichlorobenzene (B. P. 172°–173° C. at 760 mm. Hg) boils so close to the para-dichlorobenzene (B. P. 173°–174° C.) that these two isomers cannot readily be separated by fractional distillation. On freezing, para-dichlorobenzene will crystallize out from the mixture of the meta-para isomers in a relatively pure state, but the residual liquid portion of the mixture will always contain the meta-dichlorobenzene (solidifies at minus 24° C.) in admixture with a considerable amount of unprecipitated para-dichlorobenzene, probably as a liquid eutectic mixture. No simple method has heretofore been described for the separation of a pure meta-dichlorobenzene from its admixture with the other two isomers or from the meta-para fraction obtained by fractional distillation of the three isomers.

However, meta-dichlorobenzene is sulfonated with considerable ease whereas para-dichlorobenzene sulfonates much more difficultly. Thus, I have found that it is entirely feasible to sulfonate selectively the meta-dichlorobenzene in a mixture of the meta- and para-isomers by employing a quantity of sulfonating agent sufficient to react with the meta-dichlorobenzene only. Preferably, by sulfonating only from 50% to 95% of the meta-dichlorobenzene in a mixture of the two isomers, and thereafter separating the water-soluble 2,4-dichlorobenzenesulfonic acid from the unreacted meta- and para-dichlorobenzenes, it is possible to obtain a single isomer—the desired 2,4-dichlorobenzenesulfonic acid—in a high state of purity.

The sulfonation is effected by any of the reagents usually employed for the sulfonation of aromatic hydrocarbons, such as liquid sulfur trioxide, solid sulfur trioxide, gaseous sulfur trioxide, sulfuric acid, oleum (solutions of $SO_3$ in $H_2SO_4$), chlorosulfonic acid, alkali metal pyrosulfates and the adducts of sulfuric trioxide with tertiary amines and with dioxane. The conditions for such sulfonations may vary widely, and are well known to all skilled in the art. A preferred method for effecting this sulfonation is to pass the calculated amount of gaseous sulfur trioxide through or to add the calculated amount of the stabilized alpha-, beta- or gamma-forms of sulfur trioxide as a liquid or solid, to the mixture of meta- and para-dichlorobenzene, employing not more than one mole of $SO_3$ per mole of meta-isomer (and preferably from 0.50 to 0.95 mole of $SO_3$ per mole of meta-dichlorobenzene). The temperature during the introduction of the sulfur trioxide is kept below 40° C. to avoid loss of the reagent by volatilization. After all of the sulfur trioxide has been added, the sulfonation proceeds rapidly at 35° C. to 40° C. and is completed by warming the reaction mixture to 90° C. to 100° C. This preferred method for selectively sulfonating the meta-dichlorobenzene is by no means critical and may be widely varied and modified depending on the nature of the sulfonating agent.

Thus, by this technic of selective sulfonation, I effect the desired preparation of a substantially pure 2,4-dichlorobenzenesulfonic acid from a mixture of meta- and para-dichlorobenzene without the prior separation of said isomers. The 2,4-dichlorobenzenesulfonic acid is then separated from the unreacted meta- and para-dichlorobenzenes by extracting the former with water. The unreacted mixture of meta- and para-dichlorobenzenes may then be chilled (e. g. by cooling to 10°–20° C.) to crystallize out the greatest part of the para-dichlorobenzene (M. P. 53° C.). After filtering off the crystallized para-dichlorobenzene, the liquid filtrate of meta- and para-dichlorobenzenes eutectic is mixed with a fresh batch of meta-para fraction, and returned to the sulfonation step. The overall effect is to obtain a near quantitative conversion of the meta-dichlorobenzene in the mixture of meta- and para-isomers to 2,4-dichlorobenzenesulfonic acid although only 50% to 95% of the meta-isomer is sulfonated per pass.

The second step of this process involves the conversion of the extracted aqueous solution of 2,4-dichlorobenzenesulfonic acid to a water-soluble salt, e. g. by reaction with a member of the group consisting of the oxides, hydroxides and carbonates of ammonium, the alkali metals and the alkaline-earth metals and the primary, secondary and tertiary organic amines. The preferred reagent is sodium hydroxide and the extraction of the 2,4-dichlorobenzenesulfonic acid from its mixture with the unreacted isomers and the conversion of said acid to a water-soluble salt may be effected in a single step by effecting said extraction with an aqueous solution of sodium hydroxide.

The third step of the process involves the reaction of the water-soluble salt of the 2,4-dichlorobenzenesulfonic acid (of which sodium 2,4-dichlorobenzenesulfontae will henceforth be considered as the typical example) with an alkali metal hydroxide in aqueous solution at a temperature between 100° C. and 300° C. Between 100° C. and 150° C., the reaction is slow and requires an excess period for completion. Between 250° C. and 300° C., secondary degradative reactions occur which may seriously diminish the ultimate yield of the resorcinol. The preferred reaction temperature is 180° C. to 200° C. although this range is by no means critical.

The preferred alkali metal for use in this reaction is caustic soda. I employ a 10% excess over the theoretical, i. e. 4.4 moles (instead of the theoretical 4.0 moles) of alkali metal hydroxide per mole of 2,4-dichlorobenzenesulfonate salt. This is likewise not critical but merely a preferred method for effecting this reaction.

Since the reaction is effected in the liquid phase with liquid reagents, the pressure in the reaction system is not critical and does not greatly influence the reaction rate. This reaction may therefore be effected on a batchwise basis in autoclaves or on a semi-continuous or continuous process in tubular reactors or autoclaves, at temperatures of 100° C. to 300° C. at the autogenous pressure of the reaction system of the ambient temperature. The reactors or autoclaves may be constructed of steel or ferrous alloys. However, with copper-lined autoclaves or reactors, a definite catalytic effect can be noted with the reaction being markedly accelerated. A similar catalysis may be effected by the incorporation of metallic copper (e. g. copper powder) or a copper compound (e. g. cupric oxide) in the reaction mixture. With a copper-lined autoclave, a two to four hour reaction period at 180° C. to 200° C. is sufficient to effect complete dehalogenation of the 2,4-dichlorobenzenesulfonate with the formation predominantly of the corresponding salt of 2,4-dihydroxybenzenesulfonate.

The concentration of the water-soluble salt of the 2,4-dichlorobenzenesulfonic acid and the alkali metal hydroxide employed in this reaction may vary over wide ranges and do not seem to be a critical factor of the process.

In the fourth step of the process, the reaction mixture is made acid by the addition of a non-oxidizing mineral acid such as sulfuric acid, hydrochloric acid or phosphoric acid. The contents of the autoclave from the third step may be cooled and the acid added. Alternatively, the acid may be pumped into the autoclave under pressure until the reaction mixture is distinctly acid, i. e. has a pH below 2.0. The acidified reaction mixture is then heated for a short period (e. g. five to sixty minutes) at a temperature between 100° C. and 300° C. (and preferably between 150° C. and 200° C.) to effect hydrolysis of the 2,4-dihydroxybenzenesulfonic acid to resorcinol and sulfuric acid. After cooling the reaction mixture, the resorcinol may be recovered therefrom by any of the methods well known to the art, such as exhaustive extraction with diethyl ether, diisopropyl ether, benzene, dichloroethane, et cetera. Because of the danger of attack on the autoclave or reactor lining by the acid solution in the fourth step of this process, it may be desirable to effect that step in an alloy-lined autoclave, rather than in the copper-lined autoclave employed in the third step.

The yields of resorcinol obtainable by this process are from 70% to 85% of theoretical, based on the 2,4-dichlorobenzenesulfonic acid employed.

The following example is given to define and to illustrate this invention, but in no ways to limit it to reagents, proportions or conditions described therein. Obvious improvements will occur to any person skilled in the art. All parts given are parts by weight.

*Example*

A mixture of the three isomers of dichlorobenzene obtained by the high temperature vapor-phase chlorination of monochlorobenzene is fractionated, and the fraction distilling between 170° C. and 175° C. (containing 72% of meta-dichlorobenzene and 28% of para-dichlorobenzene) is recovered.

2575 parts of this meta-para fraction (17.5 moles) is cooled to 10°–20° C. and liquid, stabilized sulfur trioxide is added slowly thereto, with good agitation and cooling to keep the temperature below 40° C., until a total of 800 parts of sulfur trioxide has been added (10.0 moles, i. e. sufficient to sulfonate 80% of the 12.5 moles of meta-dichlorobenzene in the mixture). After all the sulfur trioxide has been added, stir at 35°–40° C. for an hour, then raise the temperature slowly to 95°–100° C. and agitate at that temperature for another hour. Now add 10,000 parts of 4% caustic soda solution to the reaction mixture, agitate at 95°–100° C. for several minutes, allow the aqueous layer (containing the sodium salt of 2,4-dichlorobenzenesulfonic acid) to stratify from the insoluble oil of unreacted dichlorobenzenes and separate the layers.

To the aqueous extract, add now 1760 grams of solid caustic soda (44 moles) and, when dissolved, heat the resultant solution in a copper-lined autoclave at 180° to 200° C. for three hours. The autoclave contents may be agitated although this is optional. At the conclusion of the autoclaving, the contents of the autoclave are acidified by the addition of 3675 parts of 80% sulfuric acid (30 moles), and the acidified reaction mixture is then heated in a lead-lined autoclave at 180° C. to 200° C. for 30 minutes. After cooling, and venting the small amount of sulfur dioxide formed, the reaction mixture is exhaustively extracted with diethyl ether, and the combined ether extracts are distilled to recover the solvent. There remains behind a crystalline mass of white, needle-like crystals of resorcinol, M. P. 109°–110° C.

The unreacted mixture of meta- and para-dichlorobenzenes separated as above described from the sulfonation mixture may be processed by cooling to 10°–15° C., and centrifuging off the crystals of para-dichlorobenzene which form. There is thus recovered 510 parts of para-dichlorobenzene and 550 parts of a liquid mixture of 62% meta- and 38% para-dichlorobenzenes which may be mixed with the next batch of meta-para fraction and returned to the process for further process.

Having described my invention, what I claim and desire to protect by Letters Patent is:

1. A process for the manufacture of resorcinol which comprises reacting an aqueous solution of a water-soluble salt of 2,4-dichlorobenzenesulfonic acid with an alkali metal hydroxide at a temperature between 100° C. and 300° C. for a period sufficient to effect the conversion of said salt to a water-soluble salt of 2,4-dihydroxybenzenesulfonic acid, acidifying the solution of said salt to liberate the free 2,4-dihydroxybenzenesulfonic acid by adding acid until the reaction mixture is distinctly acid, hydrolyzing the said 2,4-dihydroxybenzenesulfonic acid by heating the resulting acid solution of 2,4-dihydroxybenzenesulfonic acid at a temperature between 100° C. and 300° C. and separating the resultant resorcinol from the reaction mixture.

2. A process for the manufacture of resorcinol which comprises the steps of: (a) sulfonating a mixture of meta- and para-dichlorobenzenes at a temperature between 35° and 100° C. with a quantity of sulfonating agent not in excess of that required to sulfonate solely the meta-dichlorobenzene, and separating the resultant 2,4-dichlorobenzenesulfonic acid by extraction with an aqueous medium from the insoluble residue containing para-dichlorobenzene; (b) converting the said 2,4-dichlorobenzenesulfonic acid to a water-soluble salt of said acid by reacting the said sulfonic acid with an alkali; (c) reacting the said water-soluble salt of 2,4-dichlorobenzenesulfonic acid with an alkali metal hydroxide in an aqueous medium at a temperature between 100° C. and 300° C. for a period sufficient to effect conversion of said salt to a water-soluble salt of 2,4-dihydroxybenzenesulfonic acid; (d) acidifying the solution of said salt to liberate the free 2,4-dihydroxybenzenesulfonic acid and heating at a temperature between 100° C. and 300° C. to hydrolyze the sulfonic acid; and (e) separating the resultant resorcinol from the reaction mixture by extracting with a water immiscible solvent and evaporating the solvent.

3. The process of claim 2 in which sufficient sulfonating agent is employed to sulfonate 50% to 95% of the meta-dichlorobenzene in the mixture of the meta- and para-dichlorobenzene isomers.

4. The process of claim 2 in which the sulfonating agent is chosen from the group consisting of liquid sulfur trioxide, solid sulfur trioxide, gaseous sulfur trioxide, sulfuric acid, oleum, chlorosulfonic acid, alkali metal pyrosulfates, adducts of sulfur trioxide with tertiary amines and adducts of sulfur trioxide with dioxane.

5. The process of claim 2 in which the 2,4-dichlorobenzenesulfonic acid is converted to the sodium salt.

6. The process of claim 2 in which the water-soluble salt of the 2,4-dichlorobenzenesulfonic acid is reacted with an alkali metal hydroxide in an aqueous medium at a temperature of 180° C. to 200° C.

7. The process of claim 2 in which the solution of the water-soluble salt of 2,4-dihydroxybenzenesulfonic acid is acidified below pH 2.0 and hydrolyzed at a temperature between 100° C. and 300° C. to resorcinol and sulfuric acid.

8. The process of preparing resorcinol which comprises reacting meta dichlorobenzene with sulfur trioxide at a temperature, between 35° and 100° C., only then reacting the 2,4-dichlorobenzene sulfonic acid formed with an alkali metal hydroxide, reacting the salt formed with an excess of an alkali metal hydroxide at 100° to 300° C. to form the alkali metal salt of 2,4-dihydroxy benzene sulfonic acid, acidifying the solution to liberate the free 2,4-dihydroxy benzene sulfonic acid by adding acid until the reaction mixture is distinctly acid and hydrolyzing the said 2,4-dihydroxy benzene sulfonic acid by heating the resulting acid solution of 2,4-dihydroxy benzene sulfonic acid at a temperature between 150° C. and 300° C. and separating the resorcinol formed by extracting with a water immiscible solvent and evaporating the solvent.

References Cited in the file of this patent

UNITED STATES PATENTS

| | | |
|---|---|---|
| 1,421,869 | Von Bramer | July 4, 1922 |
| 1,849,844 | Lloyd et al. | Mar. 15, 1932 |
| 2,393,888 | Cole | Jan. 29, 1946 |
| 2,521,850 | Johnson et al. | Sept. 12, 1950 |
| 2,523,707 | Miller | Sept. 26, 1950 |

OTHER REFERENCES

Groggins et al.: "Unit Processes in Organic Synthesis," 4th ed. (1952), page 312 (1 page only). Published by McGraw-Hill Book Co., New York.